US012264430B2

(12) United States Patent
Burgess et al.

(10) Patent No.: US 12,264,430 B2
(45) Date of Patent: Apr. 1, 2025

(54) APPLIANCE LIFT SYSTEM

(71) Applicant: WHIRLPOOL CORPORATION, Benton Harbor, MI (US)

(72) Inventors: Brent M. Burgess, Edwardsburg, MI (US); Scott E. Carpenter, Harbert, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/115,209

(22) Filed: Feb. 28, 2023

(65) Prior Publication Data

US 2023/0203740 A1 Jun. 29, 2023

Related U.S. Application Data

(62) Division of application No. 16/800,255, filed on Feb. 25, 2020, now Pat. No. 11,618,989.

(51) Int. Cl.

| | |
|---|---|
| ***D06F 39/12*** | (2006.01) |
| ***B66F 11/00*** | (2006.01) |
| ***D06F 34/14*** | (2020.01) |
| ***D06F 101/00*** | (2020.01) |
| ***D06F 105/00*** | (2020.01) |

(52) U.S. Cl.

CPC ............ *D06F 39/125* (2013.01); *B66F 11/00* (2013.01); *D06F 34/14* (2020.02); *D06F 2101/00* (2020.02); *D06F 2105/00* (2020.02)

(58) Field of Classification Search

CPC .............................. A47B 77/08; D06F 39/125

See application file for complete search history.

(56) References Cited

U.S. PATENT DOCUMENTS

| | | | |
|---|---|---|---|
| 3,139,744 | A | 7/1964 | Alstyne et al. |
| 4,526,020 | A | 7/1985 | Fey et al. |
| 4,534,188 | A | 8/1985 | Fey |
| 4,535,610 | A | 8/1985 | Fey et al. |

(Continued)

FOREIGN PATENT DOCUMENTS

| | | | |
|---|---|---|---|
| CN | 100570043 | C | 12/2009 |
| CN | 101967741 | B | 1/2014 |

(Continued)

OTHER PUBLICATIONS

KR100698144B1 Machine Translation (Year: 2007).*

(Continued)

*Primary Examiner* — Spencer E. Bell

(74) *Attorney, Agent, or Firm* — Price Heneveld LLP

(57) ABSTRACT

A laundry appliance system includes a cabinet operable between a lowered position and a plurality of raised positions. A first lift assembly is coupled to a first side of the cabinet. A second lift assembly is coupled to a second side of the cabinet. The first and second lift assemblies operate concurrently to adjust the cabinet between the lowered position and the plurality of raised positions. A user-interface assembly is operably coupled to the cabinet. The user-interface assembly is configured to receive a user input corresponding with a selected raised position of the plurality of raised positions. A controller is configured to operate the first and second lift assemblies to the selected raised position in response to the user input.

20 Claims, 5 Drawing Sheets

(56) References Cited

U.S. PATENT DOCUMENTS

| | | | |
|---|---|---|---|
| 9,493,898 B2 | 11/2016 | Kim et al. | |
| 2019/0203399 A1 | 7/2019 | Zhao et al. | |
| 2021/0131008 A1* | 5/2021 | Lee | D06F 33/42 |
| 2021/0210075 A1* | 7/2021 | Kim | G10L 15/183 |

FOREIGN PATENT DOCUMENTS

| | | | |
|---|---|---|---|
| CN | 104420134 | A | 3/2015 |
| CN | 107675435 | A | 2/2018 |
| CN | 109976196 | A | 7/2019 |
| CN | 110820241 | A | 2/2020 |
| DE | 102010031164 | A | 7/2010 |
| DE | 102013109541 | A1 | 3/2015 |
| KR | 100698144 | B1 | 3/2007 |
| WO | 2005073614 | A1 | 8/2005 |

OTHER PUBLICATIONS

DE102010031164A1 Machine Translation (Year: 2012).*

Midea Washing Machine, IFA Consumer Electronics Unlimited trade show that was held in Berlin on Sep. 2-7, 2016.

* cited by examiner

APPLIANCE LIFT SYSTEM

CROSS-REFERENCE TO RELATED APPLICATIONS

This application is a divisional of U.S. patent application Ser. No. 16/800,255, filed on Feb. 25, 2020, now U.S. Pat. No. 11,618,989, entitled "APPLIANCE LIFT SYSTEM," the disclosure to which is hereby incorporated herein by reference in its entirety.

BACKGROUND OF THE DISCLOSURE

The present disclosure generally relates to a lift system, and more specifically, to a lift system for an appliance.

SUMMARY OF THE DISCLOSURE

According to one aspect of the present disclosure, a laundry appliance system includes a cabinet operable between a lowered position and a plurality of raised positions. A first lift assembly is coupled to a first side of the cabinet. A second lift assembly is coupled to a second side of the cabinet. The first and second lift assemblies operate concurrently to adjust the cabinet between the lowered position and the plurality of raised positions. A user-interface assembly is operably coupled to the cabinet. The user-interface assembly is configured to receive a user input corresponding with a selected raised position of the plurality of raised positions. A controller is configured to operate the first and second lift assemblies to the selected raised position in response to the user input.

According to another aspect of the present disclosure, a laundry appliance assembly includes a storage unit that defines an interior cavity. A cabinet is operably coupled with the storage unit. The cabinet is operable between a docked position and a use position. The cabinet is disposed within the interior cavity of the storage unit when in the docked position. A decorative member is coupled to an upper surface of the cabinet. The cabinet is concealed by the decorative member and the storage unit when in the docked position. A lift system is operably coupled to the cabinet. The lift system is configured to move the cabinet between the docked position and the use position.

According to another aspect of the present disclosure, an appliance assembly includes a storage unit that defines a front opening. The storage unit defines an interior cavity. A cabinet is disposed within the interior cavity. The cabinet is operable between a first position, a second position, and a third position. The cabinet is disposed at least partially within the interior cavity when in each of the first, second, and third positions. A lift system is coupled to the storage unit and the cabinet. The lift assembly is configured to operate the cabinet between the first, second, and third positions.

These and other features, advantages, and objects of the present disclosure will be further understood and appreciated by those skilled in the art by reference to the following specification, claims, and appended drawings.

Figure 1:
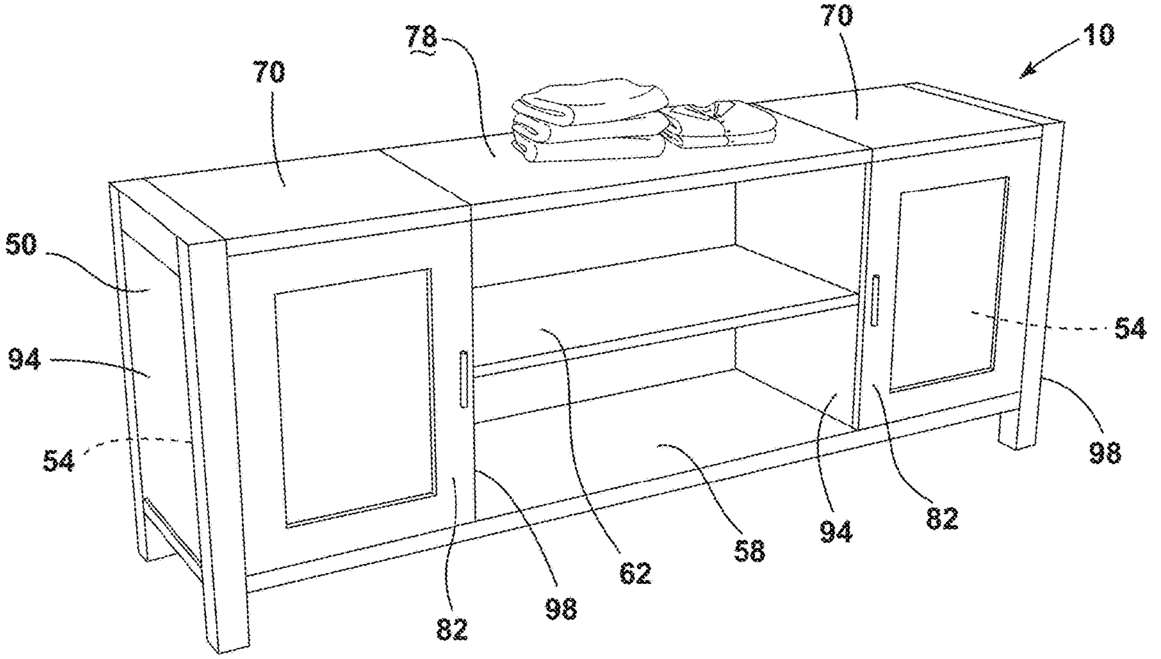
FIG. 1 is a front perspective view of an appliance lift system, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an appliance lift system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally designates a laundry appliance system that includes a cabinet 14 operable between a lowered position 18 and a plurality of raised positions 22. A first lift assembly 26 is coupled to a first side 30 of the cabinet 14. A second lift assembly 34 is coupled to a second side 38 of the cabinet 14. The first and second lift assemblies 26, 34 operate concurrently to move the cabinet 14 between the lowered position 18 and the plurality of raised positions 22. A user-interface assembly 42 is operably coupled to the cabinet 14. The user-interface assembly 42 is configured to receive a user input corresponding with a selected raised position 22 of the plurality of raised positions 22. A controller 46 is configured to operate the first and second lift assemblies 26, 34 to the selected raised position 22 in response to the user input.

Figure 2:
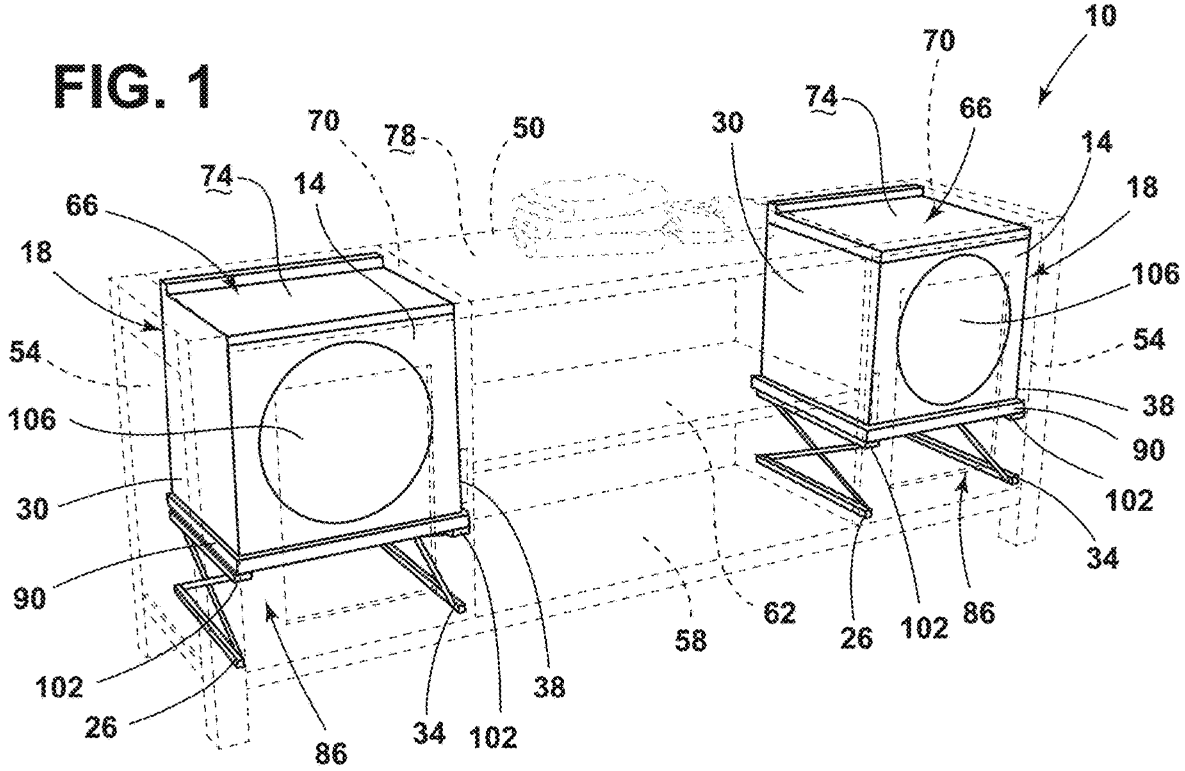
FIG. 2 is a front perspective view of an appliance lift system with the appliances in a docked position within a storage unit illustrated in phantom, according to the present disclosure.

Referring to FIGS. 1 and 2, the laundry appliance system 10 includes a storage unit 50 defining at least one interior cavity 54. In the illustrated example of FIG. 2, the storage unit 50 defines two interior cavities 54 spaced-apart from one another by a storage space 58. The storage space 58 may be any type of storage area. For example, the storage space 58 may be an open cavity or space (e.g., having no door) or a closed space (e.g., having a door). Additional storage features, such as one or more shelves 62, can be disposed within the storage space 58.

As illustrated in FIG. 2, the laundry appliance system 10 includes two appliances 66, with each appliance 66 disposed within a respective interior cavity 54 of the storage unit 50. Each appliance 66 includes the cabinet 14. Each appliance 66 is illustrated in a lowered docked position 18 within the interior cavity 54 of the storage unit 50. When in the docked position 18, the appliance 66 is disposed entirely within the interior cavity 54. Typically, a decorative panel or member 70 is coupled to an upper surface 74 of the cabinet 14. The decorative member 70 may correspond with the storage unit 50 to provide a substantially even surface across the storage unit 50 when the appliance 66 is in the docked position 18. When in the docked position 18, the decorative member 70 is generally coplanar with a top surface 78 of the storage unit 50. This configuration provides for a substantially continuous top surface 78 of the storage unit 50 to provide additional storage for a user. Further, the continuous top surface 78 allows the user to place and/or store items on the storage unit 50. Additionally, when in the docked position 18, the appliance 66 is concealed by the decorative member 70 on the storage unit 50. This configuration provides for increased aesthetics for the storage unit (e.g., furniture), which can be placed in a living space and hide the appliance 66.

Figure 3:
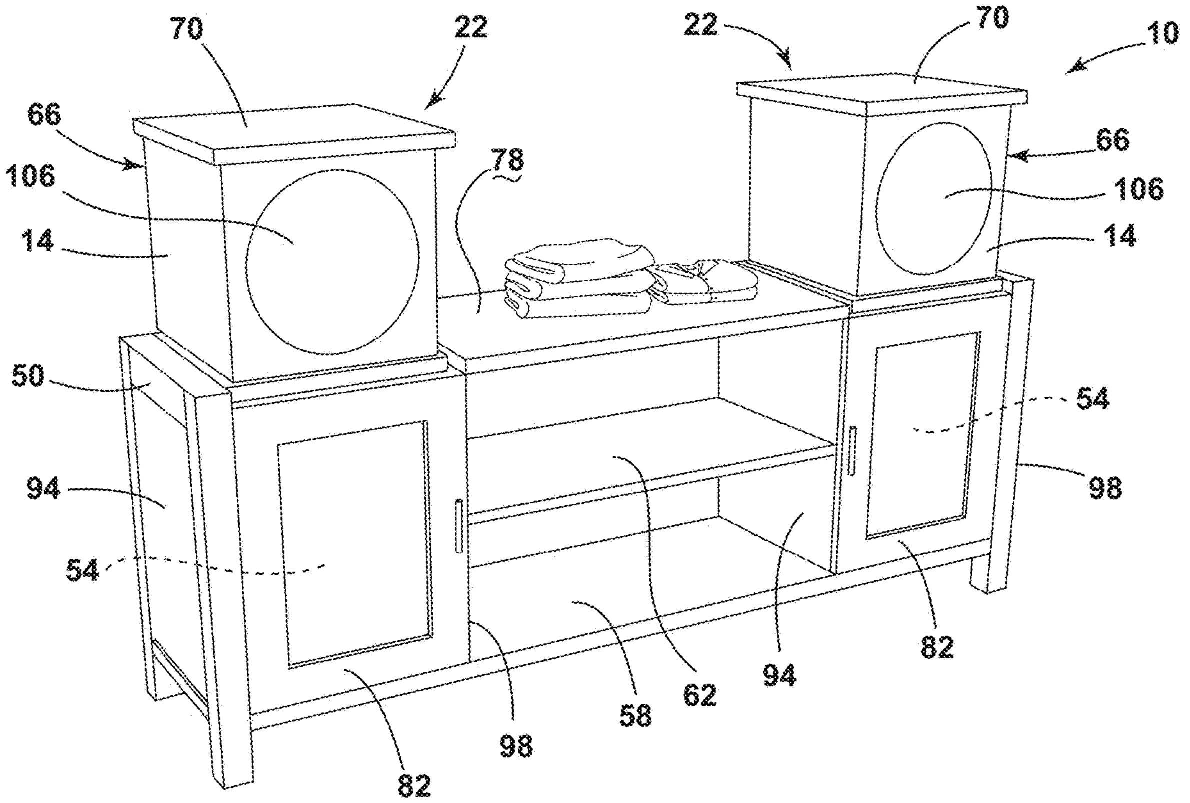
FIG. 3 is a front perspective view of an appliance lift system with the appliances in a use position, according to the present disclosure.

Referring to FIGS. 2 and 3, the appliance 66 is operable between the docked position 18 and the plurality of raised use positions 22. Typically, the docked position 18 is the lowest position of the appliance 66 within the storage unit 50. Each use position 22 is a position that is vertically above the docked position 18. The specific use position 22 can be determined by the user. As previously explained, the appliance 66 is disposed within the interior cavity 54 when in the docked position 18. When the appliance 66 is in the use position 22, the appliance 66 extends at least partially out of the interior cavity 54. The portion of the appliance 66 that extends out of the interior cavity 54 can vary based on the selected use position 22, as well as the portion of the appliance 66 needed to be accessed.

When in the docked position 18, as illustrated in FIG. 2, the appliance 66 is typically not physically accessible by the user. The storage unit 50 includes a door 82 proximate each interior cavity 54, which operates to enclose the appliance 66 in the respective interior cavity 54. It is contemplated that the doors 82 of the storage unit 50 remain locked and are typically unlocked for servicing, such as for maintenance and repair by a service technician. Each door 82 can be opened to access the appliance 66 when in the docked position 18. The doors 82 remaining locked is advantageous for preventing a user from accessing a lift system 86 disposed below the appliance 66 while the lift system 86 is operating.

The lift system 86 is operably coupled to the appliance 66 and configured to adjust or move the appliance 66 within the laundry appliance system 10 between the docked position 18 and the plurality of use positions 22. Typically, the lift system 86 includes the first lift assembly 26 and the second lift assembly 34. It is contemplated that each appliance 66 is operably coupled with the storage unit 50, and each appliance 66 is coupled to an independent lift system 86. In various examples, the first lift assembly 26 is coupled to the first side 30 of the appliance 66, and the second lift assembly 34 is coupled to the second side 38 of the appliance 66. The first and second lift assemblies 26, 34 operate concurrently to move the appliance 66 between the docked position 18 and the plurality of use positions 22. Concurrent operation of the first and second lift assemblies 26, 34 provides for smoother movement of the appliance 66 between the docked and use positions 18, 22.

Referring again to FIGS. 2 and 3, the appliance 66 can include a base frame 90, and the lift system 86 is coupled to the base frame 90. The base frame 90 can be part of the cabinet 14, or a separate component coupled to the cabinet 14. The base frame 90 provides additional support and stability to the appliance 66. The base frame 90 may also assist in leveling the appliance 66 as the appliance 66 is moved by the lift system 86. The configuration of the lift system 86 may vary based on the configuration of the appliance 66, the storage unit 50, and other aspects of the laundry appliance system 10. The lift system 86 may be able to position the appliance 66 at any desired use position 22 without departing from the teachings herein. It is contemplated that the lift system 86 can be coupled to the appliance 66 at one or both of the cabinet 14 and the base frame 90.

In a non-limiting example, the first and second lift assemblies 26, 34 may be configured as scissor lifts. The scissor lifts can be positioned substantially, or entirely, underneath the base frame 90 supporting the appliance 66. The scissor lifts can maximize space within the interior cavity 54 by being positioned adjacent to opposing sidewalls 94, 98 of the storage unit 50 that partially define the interior cavity 54. In another non-limiting example, each of the first and second lift assemblies 26, 34 may be configured as a rack and pinion assembly. The rack and pinion assembly may utilize more space within the interior cavity 54 than the scissor lift configuration. Typically, the lift system 86 includes at least one motor 102 for motorized operation of the lift system 86. Each of the first and second lift assemblies 26, 34 can include a separate motor 102 to independently operate each of the first and second lift assemblies 26, 34. Additional types of lift systems 86 are contemplated for operating moving the appliance 66 without departing from the teachings herein.

The appliance 66 is operable between the docked position 18 when the appliance 66 is typically entirely within the interior cavity 54, and the plurality of use positions 22, when the appliance 66 at least partially extends out of the interior cavity 54. The plurality of use positions 22 can be any position above the docked position 18. The use position 22 illustrated in FIG. 3 is a fully raised position. In certain aspects, the fully raised position is the farthest the appliance 66 can be moved from the docked position 18. In the illustrated use position 22, the decorative member 70 is offset from the top surface 78 of the storage unit 50. The appliance 66 extends between the decorative member 70 and the top surface 78 of the storage unit 50.

When in the use position 22, the user can physically access all or part of the appliance 66. The use position 22 can correspond with a position for physically accessing specific features of the appliance 66 without moving the appliance 66 to the fully raised position. Accordingly, the appliance 66 can extend partially above the top surface 78 of the storage unit 50 and be in the use position 22. The use position 22 can depend on a height-related characteristic of the appliance 66 and/or height-related characteristic of the user.

The height-related characteristic of the appliance 66 can correspond with any feature on the appliance 66. For example, the use position 22 can correspond with the height-related characteristic that provides physical access to a door 106 of the appliance 66. Typically, the door 106 is rotatably coupled to the cabinet 14 and configured to rotate about a vertical axis. However, other configurations of the door 106 are contemplated without departing from the teachings herein. In another non-limiting example where the appliance 66 is configured as a laundry appliance, the height-related characteristic of the appliance 66 can be a drum, allowing the user to load and/or unload laundry from the appliance 66. In an additional non-limiting example where the appliance 66 is a laundry appliance, the height-related characteristic may be dispensing containers for adding laundry chemistry or other liquids. The use position 22 can provide access to the specific height-related characteristic of the appliance 66.

Figure 4:
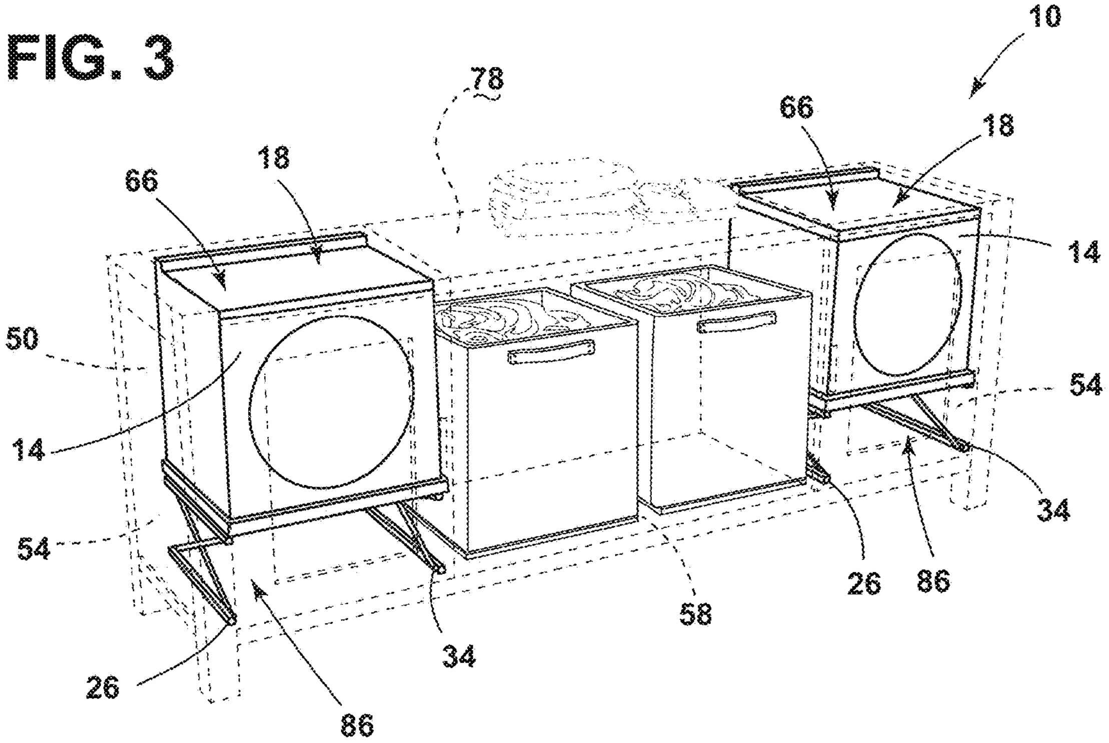
FIG. 4 is a front perspective view of an appliance lift system with the appliances in the docked position within a storage unit illustrated in phantom, according to the present disclosure.

Referring to FIG. 4, an additional or alternative configuration of the storage unit 50 is illustrated. In various examples, the storage space 58 defined between the two interior cavities 54 is a generally open storage space 58, which is free from any shelves 62 (FIG. 1). The open storage space 58 may be advantageous for providing additional storage, for example, to store laundry baskets or hampers when the appliance 66 is a laundry appliance.

Referring to FIGS. 5A-5G, additional or alternative configurations of the laundry appliance system 10 are illustrated. The laundry appliance system 10 may have a variety of configurations that can be customizable. The different configurations of the laundry appliance system 10 provide for a different number of appliances 66, different sized storage spaces 58, and/or different types of storage spaces 58. Each of the laundry appliance systems 10 operate in a substantially similar manner. Customizing the laundry appliance system 10 is advantageous for allowing a user to determine which configuration best fits the residential or commercial setting in which the laundry appliance system 10 will be used.

Figure 5A:
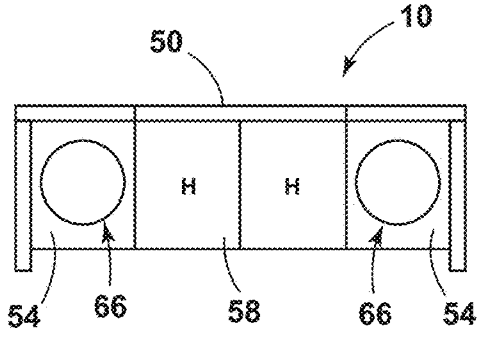
FIG. 5A is a front schematic view of an appliance lift system, according to the present disclosure.

Referring to FIG. 5A, a laundry appliance system 10 is illustrated similar to the laundry appliance system 10 illustrated in FIG. 4. The laundry appliance system 10 includes two appliances 66, each disposed within the respective interior cavity 54 of the storage unit 50. The storage space 58 is substantially the same size as two interior cavities 54 disposed adjacent to one another. The size of the storage space 58 provides for multiple hampers, laundry baskets, or storage receptacles. While two large hampers are illustrated, multiple smaller hampers in various configurations may be stored in the storage space 58.

Figure 5B:
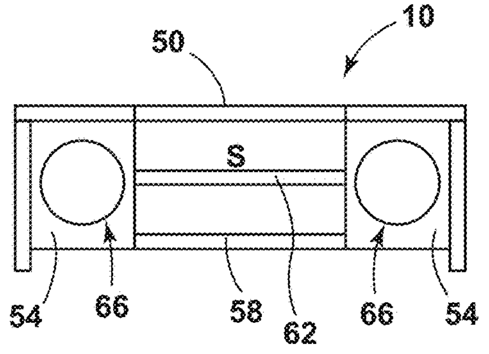
FIG. 5B is a front schematic view of the appliance lift system, according to the present disclosure.

The laundry appliance system 10 of FIG. 5B is similar to the laundry appliance system 10 illustrated in FIG. 1. The laundry appliance system 10 of FIG. 5B includes two appliances 66 each disposed within a separate interior cavity 54. The storage space 58 is disposed between the two appliances 66 and is substantially the same size as two adjacent interior cavities 54. The storage space 58 includes one or more shelves 62 disposed therein. It is contemplated that multiple hampers, laundry baskets, or storage receptacles can be stored on the shelves 62.

Figure 5C:
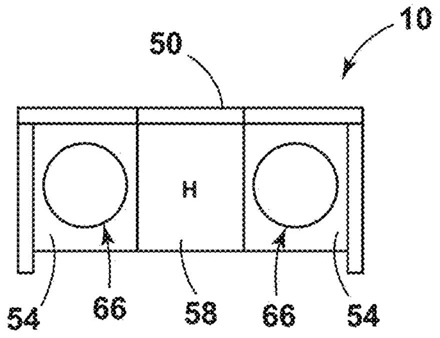
FIG. 5C is a front schematic view of the appliance lift system, according to the present disclosure.

Referring to the configuration illustrated in FIG. 5C, the laundry appliance system 10 includes two appliances 66 spaced-apart from one another by the storage space 58. The storage space 58 is substantially similar in size to a single interior cavity 54. Accordingly, a single large hamper is illustrated in the storage space 58, however other configurations with smaller storage receptacles are contemplated without departing from the teachings herein. This provides for a similar, but smaller configuration than FIG. 5A.

Figure 5D:
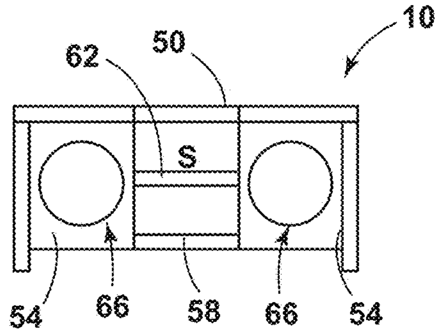
FIG. 5D is a front schematic view of the appliance lift system, according to the present disclosure.

Referring to FIG. 5D, the laundry appliance system 10 includes two appliances 66 spaced-apart by the storage space 58. The storage space 58 is substantially similar in size to one interior cavity 54 and includes one or more shelves 62 disposed therein. The configuration of FIG. 5D provides a similar arrangement of the laundry appliance system 10 as the configuration illustrated in FIG. 5B, but provides a smaller storage space 58.

Figure 5E:
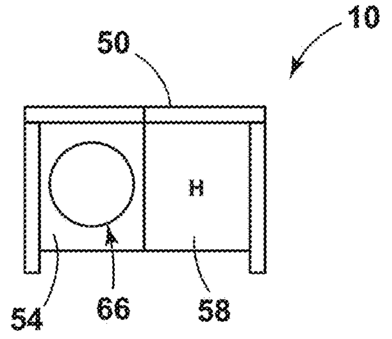
FIG. 5E is a front schematic view of the appliance lift system, according to the present disclosure.

Referring to FIG. 5E, the laundry appliance system 10 can include a single appliance 66. In such configurations, the storage unit 50 defines one interior cavity 54 and the appliance 66 is disposed therein. The storage unit 50 defines the storage space 58 adjacent to the interior cavity 54. The storage space 58 is substantially the same size as a single interior cavity 54. Accordingly, as illustrated, the storage space 58 is sized to house approximately a single hamper or laundry basket, however other configurations are contemplated.

Figure 5F:
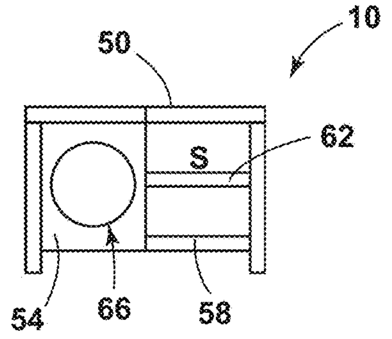
FIG. 5F is a front schematic view of the appliance lift system, according to the present disclosure.

The laundry appliance system 10 illustrated in FIG. 5F is similar to the configuration illustrated in FIG. 5E. However, the storage space 58 includes one or more shelves 62 disposed therein.

Figure 5G:
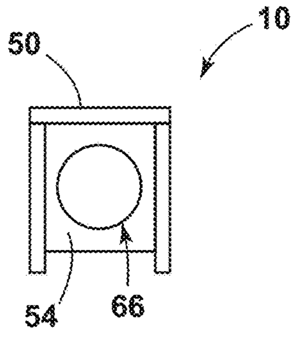
FIG. 5G is a front schematic view of the appliance lift system, according to the present disclosure.

Referring to FIG. 5G, the laundry appliance system 10 includes the single appliance 66 disposed within the interior cavity 54 of the storage unit 50. The configuration of FIG. 5G is free of the storage space 58. Accordingly, the storage unit 50 is sized to accommodate the appliance 66 but does not include additional storage space 58.

The configurations illustrated in FIGS. 5A-5G each provide only a single appliance 66 disposed within a respective interior cavity 54. The configurations and arrangements illustrated in FIGS. 5A-5G are merely exemplary, such that the laundry appliance system 10 may have additional or alternative configurations without departing from the teachings herein. Where hampers are smaller, more hampers can be stored within the storage space 58. The hampers shown are exemplary in nature and other sizes and configurations of hampers are contemplated.

Figure 6:
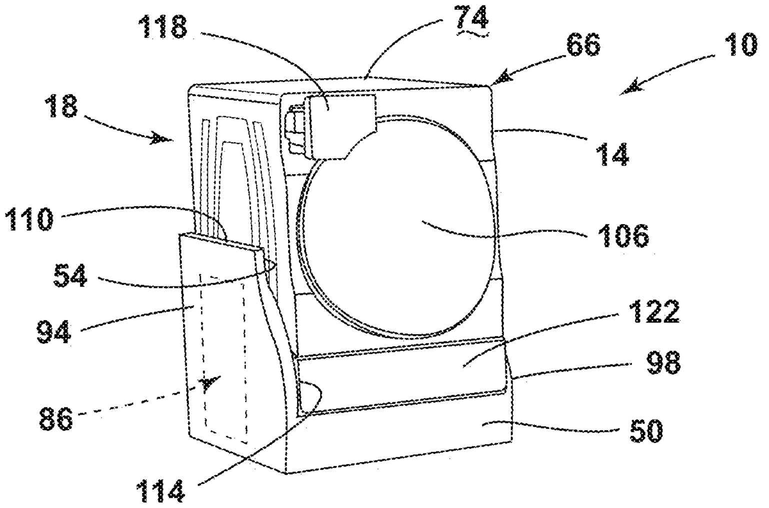
FIG. 6 is a front perspective view of a laundry appliance system with an appliance in a docked position in a storage unit, according to the present disclosure.
Figure 7:
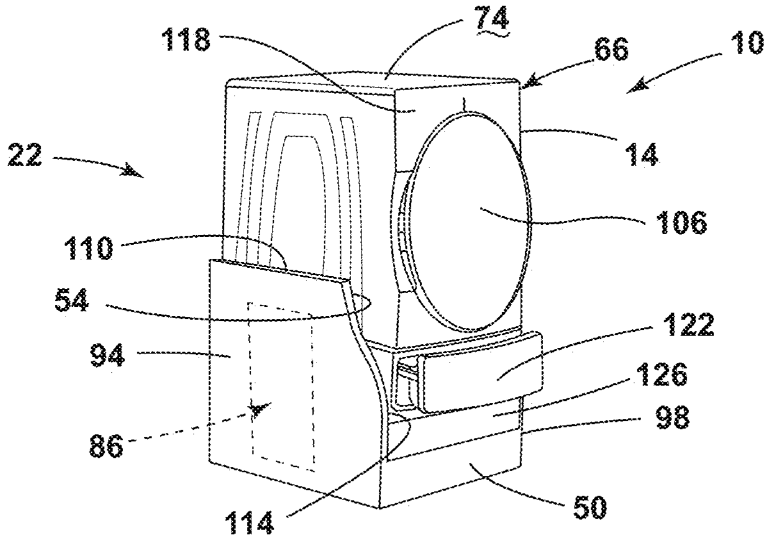
FIG. 7 is a front perspective view of a laundry appliance system with an appliance in a use position in a storage unit, according to the present disclosure.
Figure 8:
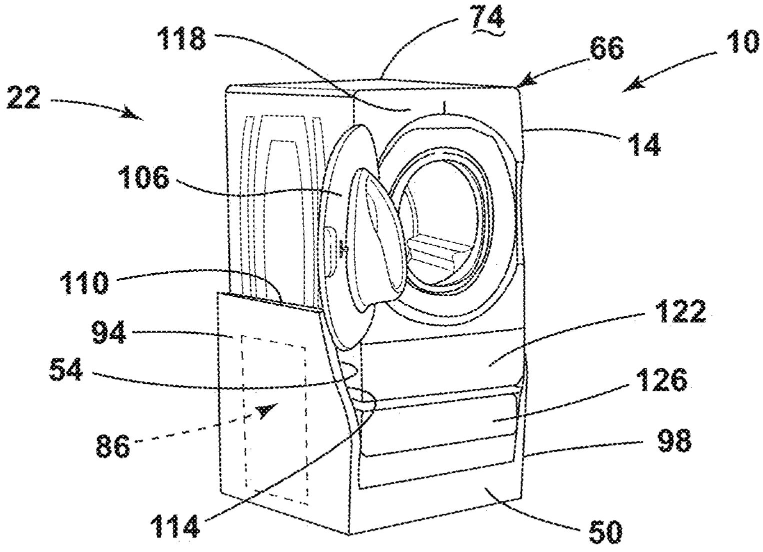
FIG. 8 is a front perspective view of a laundry appliance system with an appliance in a use position in a storage unit, according to the present disclosure.

Referring to FIGS. 6-8, an additional or alternative configuration of the laundry appliance system 10 is illustrated. The storage unit 50 defines an upper opening 110 that the appliance 66 extends through. The storage unit 50 further defines a front opening 114 to access various features on the appliance 66 disposed within the storage unit 50. The storage unit 50 defines the interior cavity 54 and the appliance 66 is disposed within the interior cavity 54. The appliance 66 is operable between the docked position 18, as illustrated in FIG. 6, and a plurality of use positions 22, as illustrated in FIGS. 7 and 8. The appliance 66 is disposed at least partially within the interior cavity 54 of the storage unit 50 when in each of the docked position 18 and the plurality of use positions 22.

The lift system 86 is operably coupled to the storage unit 50 and the appliance 66. The lift system 86 includes the first and second lift assemblies 26, 34 coupled to the first and second sides 30, 38 of the appliance 66, respectively. The lift system 86 can include, for example, rack and pinion assemblies, scissor lifts, or other similar motorized lifting assemblies.

Referring to FIG. 6, the appliance 66 is in the docked position 18. The docked position 18 is typically the lowest position of the appliance 66 within the storage unit 50. The docked position 18 provides a low center of gravity for the appliance 66. Additionally, the docked position 18 can correspond with a height-related characteristic of the appliance 66. For example, the height-related characteristic can be a single-use dispensing drawer disposed proximate the upper surface 74 of the cabinet 14.

Referring to FIG. 7, the appliance 66 is positioned in one of the plurality of use positions 22. The use position 22 is disposed above the docked position 18. Accordingly, a bottom of the appliance 66 is spaced-apart from the storage unit 50 due to the front opening 114. The use position, as illustrated in FIG. 7, can be based on a height-related characteristic of a specific feature of the appliance 66. For example, the use position 22 may be advantageous for accessing a bulk dispensing drawer 122 disposed below the door 106 of the appliance 66.

Referring to FIG. 8, the appliance 66 is illustrated in an additional use position 22 of the plurality of use positions 22. The use position 22, as illustrated in FIG. 8, is above the use position 22 illustrated in FIG. 7. The use position 22 illustrated in FIG. 8 may be a fully raised position. The use position 22 can be based on a height-related characteristic of the appliance 66. For example, the use position 22 may provide greater access to the door 106 and/or to an inner cavity of the appliance 66. In configurations where the appliance 66 is the laundry appliance system 10, the illustrated use position 22 can provide greater access to the drum to assist the user in loading and/or unloading laundry.

In FIGS. 7 and 8, as the appliance 66 is moved to the use position 22, the appliance 66 becomes spaced-apart from the storage unit 50 due to the front opening 114. A cover member 126 can be disposed between the storage unit 50 and the appliance 66. The cover member 126 may fill the front opening 114 as the appliance 66 moves to the use position 22. In a non-limiting example, the cover member 126 may be an accordion-style cover member 126 disposed over the lift system 86 and configured to expand and collapse with the movement of the appliance 66. The cover member 126 is advantageous for preventing access to the interior cavity 54 of the storage unit 50, as well as the lift system 86.

Referring to FIGS. 1-8, in each configuration of the laundry appliance system 10, the appliance 66 is operable between the docked position 18 and the plurality of use positions 22. The storage unit 50 typically provides a cord management system for organizing a power cord, water lines, and/or other connectors that extend between the appliance 66 and residential or commercial settings. The cord management system allows the appliance 66 to move without affecting the operation of the appliance 66. For example, the cords and other connections of the appliance 66 may be taut when the appliance 66 is in the use position 22 and may be slack or coiled when the appliance 66 is in the docked position 18. Other configurations of the cord management system are contemplated without departing from the teachings herein. Additionally, while the appliance 66 is illustrated as a laundry appliance, it is contemplated that other appliances such as, for example, refrigerators, freezers, coolers, ovens, dishwashers, water heaters, and other similar appliances and fixtures within household and commercial settings can be operably coupled with the storage unit 50.

Figure 9:
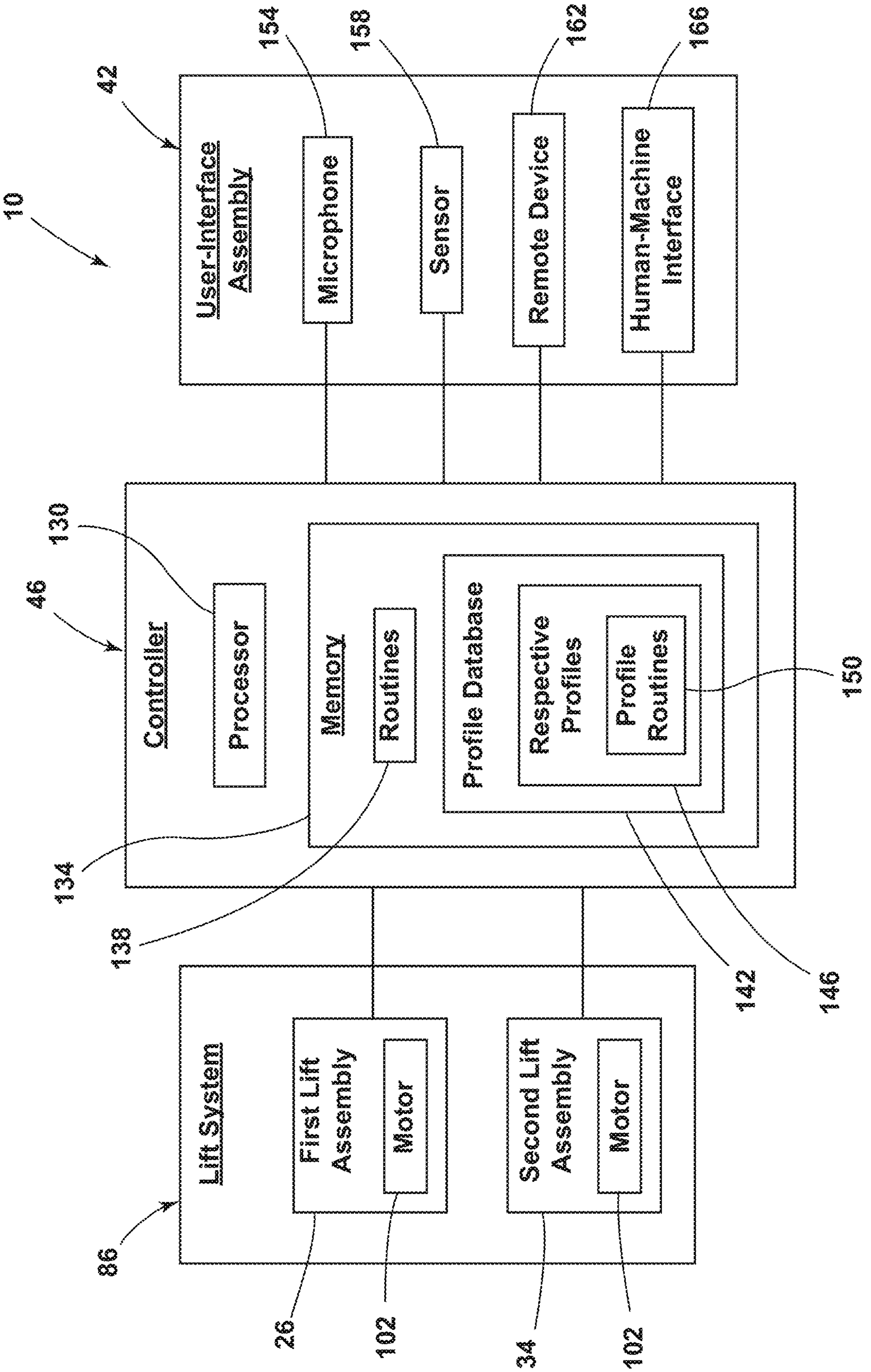
FIG. 9 is a block diagram of a laundry appliance system, according to the present disclosure.

Referring to FIG. 9, and with further reference to FIGS. 1-8, the laundry appliance system 10 includes the controller 46 that has a processor 130, a memory 134, and other control circuitry. Instructions or routines 138 are stored within the memory 134 and executable by the processor 130. Typically, the routines 138 include instructions relating to the operation of the appliance 66. A profile database 142 may be stored within the memory 134 of the controller 46. The profile database 142 includes respective user profiles 146 for one or more users of the appliance 66. The user profiles 146 may correspond with saved settings for each of the users of the appliance 66. Profile routines 150 may be stored within each respective user profile 146. The profile routines 150 typically include instructions on the operation of the appliance 66 and/or the lift system 86 based on the stored settings for the respective user.

The laundry appliance system 10 includes the user-interface assembly 42 in communication with the controller 46. The user can provide a command or user input to the laundry appliance system 10 through the user-interface assembly 42. The user input can control, for example, operation of the appliance 66, operation of the lift system 86, selection of a specific use position 22 of the appliance 66, and other features of the laundry appliance system 10. The user-interface assembly 42 can include a variety of methods for inputting and/or receiving the user commands.

In a non-limiting example, the user-interface assembly 42 includes a microphone 154 for receiving voice commands from the user. The microphone 154 can be coupled to one or more of the storage unit 50, the appliance 66, and the lift system 86. The microphone 154 can receive the voice command and send a corresponding signal to the controller 46. Based on the voice command, the controller 46 can perform the routines 138 to perform the selected operation of the appliance 66. In various examples, the controller 46 may be configured to determine which user is giving the voice command and automatically select the respective user profile 146. In such configurations, the controller 46 is configured to perform the profile routines 150 for the respective profile 146 of the user.

In another non-limiting example, the user-interface assembly 42 includes a sensor 158, which can be coupled to one or more of the storage unit 50, the appliance 66, and the lift systems 86. The sensor 158 defines a sensor field and is configured to obtain data in the sensor field. The sensed information and/or obtained data from the sensor field is communicated to the controller 46. The controller 46 is configured to recognize someone intending to use the laundry appliance system 10 and/or recognize a specific user from the sensed information.

In various examples, the controller 46 is configured to determine a height-related characteristic of the user via information received from one or both of the microphone 154 and the sensor 158. Accordingly, the microphone 154 and the sensor 158 can be used in conjunction with and/or independently of one another. The height-related characteristic of the user may be a location or originating point of the voice command, a location of eyes of the user, a location of the head or shoulders of the user, or another height-related feature of the user. The controller 46 is configured to control the appliance 66 and/or the lift system 86 in response to the height-related characteristic of the user or fixture associated with the user (e.g., a wheelchair).

In an additional non-limiting example, the user-interface assembly 42 includes a remote device 162 that can operate independently of or in conjunction with one or both of the microphone 154 and the sensor 158. The remote device 162 is in communication with the controller 46, typically via a network, and is configured to communicate the user input to the controller 46. The remote device 162 can be, for example, a portable electronic device, a mobile phone, a laptop, a tablet, or another remote electronic device.

The controller 46 includes communication circuitry, which is configured to communicate with the remote device 162 and/or remote servers (e.g., cloud servers, Internet-connected databases, computers, etc.) via a communication interface. The communication interface may be a wireless interface. The communication interface may correspond to a variety of communication protocols configured to distribute data among various electronic devices. For example, the communication interface may include an IEEE 802.11 connection, an IEEE 802.15 connection, a Bluetooth® connection, a Wi-Fi connection, a WiMAX connection, a cellular signal, a signal using shared wireless access protocol cord axis (SWAP-CA), or any other type of radiofrequency or wireless signal. In this way, the communication interface may provide for data communication between the controller 46 and the remote device 162.

In another non-limiting example, the user-interface assembly 42 includes a human-machine interface (HMI) 166. The HMI 166 can be coupled to one or more of the storage unit 50, the appliance 66, and the lift system 86. The HMI 166 can be used independently of or in conjunction with one or more of the microphone 154, the sensor 158, and the remote device 162. The HMI 166 can include a touch panel, touch features, or buttons that the user can select to control operations of the laundry appliance system 10. The user can input the command via the HMI 166, and the HMI 166 can communicate a corresponding signal to the controller 46.

The controller 46 is configured to operate the lift system 86 in response to the user input received from the user-interface assembly 42. The user-interface assembly 42 may be coupled with the appliance 66, the storage unit 50, and/or the lift system 86. The user input can correspond to operation of the appliance 66 (e.g., start of a cycle, end of a cycle, etc.) and/or operation of the lift system 86 (e.g., adjusting between the docked position 18 and the use position 22). In certain aspects, the controller 46 is configured to operate the first and second lift assemblies 26, 34 to the selected use position 22 in response to the user input received to the user-interface assembly 42.

According to various aspects, the controller 46 is configured to work in conjunction with the user-interface assembly 42 to determine the height-related characteristic of the user and subsequently control the operation of the first and second lift assemblies 26, 34. The controller 46 is configured to automatically move or adjust the first and second lift assemblies 26, 34 in response to the height-related characteristic of the user. The laundry appliance system 10 includes an adjustable use position 22 based on the height-related characteristic of the user. In a non-limiting example, if the user has a stored user profile 146, the controller 46 is configured to adjust the lift system 86 based on the information stored in the respective profile 146. The selected use position 22 may be a predefined height or position of the appliance 66 based on the user height-related characteristic stored within the respective profile 146. If the user does not have a stored user profile 146, the controller 46 is configured to adjust the lift system 86 in response to the information received from the user-interface assembly 42 (e.g., a height-related characteristic).

The controller 46 is also configured to operate the lift system 86 in response to a height-related characteristic of a specific feature of the appliance 66. The appliance 66 can be moved to the use position 22 that maximizes access to the specific feature chosen by the user. Additionally or alternatively, the controller 46 can adjust the use position 22 in response to a height-related characteristic of the user and a height-related characteristic of the appliance 66. In this way, the laundry appliance system 10 provides maximum access to specific features of the appliance 66 for each user.

Referring still to FIG. 9, the controller 46 is configured to operate the lift system 86 in response to and/or in conjunction with operation of the appliance 66. Different stages of operation of the appliance 66 (e.g., start, end, etc.) can result in different positions of the appliance 66. For example, the controller 46 is configured to move the appliance 66 to the docked position 18 prior to the start of an operation (e.g., a laundry cycle start). This configuration is advantageous for operating the appliance 66 in the position with the lowest center of gravity. In another non-limiting example, the controller 46 may be configured to move the appliance 66 to the use position 22 via the lift system 86 when the operation ends (e.g., laundry cycle end). Upon completion of the cycle or operation of the appliance 66, the controller 46 may operate the lift system 86 to move the appliance 66 to the use position 22. This is advantageous for providing a visual indicator to the user that the cycle is complete. Additionally, this is advantageous for moving the appliance 66 to a position accessible to the user.

In an additional non-limiting example where the appliance 66 is a laundry appliance, the controller 46 may be configured to move the appliance 66 when the controller 46 detects that laundry chemistry or other liquid has not been added. For example, if a user forgets to insert the laundry chemistry and attempts to start the laundry cycle, the controller 46 is configured to move the appliance 66 to the use position to alert the user that laundry chemistry has not been added. The use position 22 may be based on a height-related feature of the appliance 66, such as, for example, the single-use dispensing drawer 118 or the bulk dispensing drawer 122.

In various examples, the controller is configured to adjust the appliance 66 based on a position of the door 106. When the door 106 is in an opened position, the controller 46 may prevent movement of the appliance 66. When the door 106 is in a closed position, the controller 46 is configured to move the appliance 66 between the docked position 18 and any one of the use positions 22.

The controller 46 is in communication with the lift system 86 to adjust the appliance 66 between the docked position 18 and the plurality of use positions 22. The controller 46 is configured to send a signal to the motor 102 of each of the first and second lift assemblies 26, 34 to adjust the lift system 86. According to various aspects, the controller 46 may be configured to operate the lift system 86 to tilt the appliance 66. In such examples, a rear portion of each of the first and second lift assemblies 26, 34 can be moved to a height above a front portion of each of the first and second lift assemblies 26, 34, respectively. The tilted appliance 66 may be advantageous for providing greater access to a feature of the appliance 66, such as, for example, an inner cavity. In certain aspects where the appliance 66 is a laundry appliance, tilting the laundry appliance can assist the user with loading and/or unloading laundry from the drum. The lift system 86 may be operated such that the first and second lift assemblies 26, 34 are operated concurrently between the docked position 18 and the use position 22, including a tilted use position 22.

Use of the present disclosure provides for a variety of advantages. For example, the appliance 66 can be concealed from view within the storage unit 50. Additionally, the appliance 66 can be moved between the docked position 18 and the use position 22 based on a command received through the user-interface assembly 42 or in response to an operation or status of the appliance 66. Further, the use position 22 may be based on a height-related characteristic of the user and/or a height-related characteristic of a feature of the appliance 66. Also, the controller 46 includes the profile database 142 that stores respective user profiles 146 to provide customizable settings (e.g., the plurality of use positions 22) for each user. Additionally, the user-interface assembly 42 can provide information to the controller 46, such that the controller 46 can operate the lift system 86 to a selected use position 22 based on the height-related characteristic of the user. Additional benefits and/or advantages of using this device may also be realized and/or achieved.

According to one aspect of the present disclosure, a laundry appliance system includes a cabinet operable between a lowered position and a plurality of raised positions. A first lift assembly is coupled to a first side of the cabinet. A second lift assembly is coupled to a second side of the cabinet. The first and second lift assemblies operate concurrently to adjust the cabinet between the lowered position and the plurality of raised positions. A user-interface assembly is operably coupled to the cabinet. The user-interface assembly is configured to receive a user input corresponding with a selected raised position of the plurality of raised positions. A controller is configured to operate the first and second lift assemblies to the selected raised position in response to the user input.

According to another aspect, a user-interface assembly includes a microphone. A user input is a voice command received by the microphone.

According to another aspect, a user-interface assembly includes a remote device in communication with a controller. A user input is received by the remote device and communicated to the controller.

According to another aspect, a user-interface assembly includes a sensor. A controller is configured to determine a height-related characteristic of a user based on sensed information received from the sensor and automatically adjusts first and second lift assemblies.

According to another aspect, a controller is configured to adjust first and second lift assemblies in response to at least one of a laundry cycle start, a laundry cycle end, and a laundry chemistry addition.

According to another aspect, a controller stores a profile of a user. The controller is configured to adjust the selected raised position of a cabinet in response to a selection of a profile.

According to another aspect, a selected raised position is a predefined height based on a user height-related characteristic stored in a profile.

According to another aspect, a controller includes a memory storing a profile database of respective profiles for one or more users.

According to another aspect of the present disclosure, a laundry appliance assembly includes a storage unit that defines an interior cavity. A cabinet is operably coupled with the storage unit. The cabinet is operable between a docked position and a use position. The cabinet is disposed within the interior cavity of the storage unit when in the docked position. A decorative member is coupled to an upper surface of the cabinet. The cabinet is concealed by the decorative member and the storage unit when in the docked position. A lift system is operably coupled to the cabinet. The lift system is configured to adjust the cabinet between the docked position and the use position.

According to another aspect, a sensor is coupled to the storage unit. A controller is configured to receive a signal from the sensor. The controller is configured to determine a height-related characteristic of a user in response to the signal. The controller is configured to automatically adjust the lift system in response to the height-related characteristic of the user.

According to another aspect, a lift system includes a motor and at least one of a rack and pinion assembly and a scissor lift assembly.

According to another aspect, a controller is configured to move a cabinet to the docked position via the lift system prior to a laundry cycle start.

According to another aspect, a door is coupled to a cabinet. A controller is configured to adjust the cabinet to the docked position via a lift system when the door is in a closed position.

According to another aspect, an accordion cover member is disposed over the lift system.

According to another aspect of the present disclosure, an appliance assembly includes a storage unit that defines a front opening. The storage unit defines an interior cavity. A cabinet disposed within the interior cavity. The cabinet is operable between a first position, a second position, and a third position. The cabinet is disposed at least partially within the interior cavity when in each of the first, second, and third positions. A lift system is coupled to the storage unit and the cabinet. The lift system is configured to operate the cabinet between the first, second, and third positions.

According to another aspect, a first position is a docked position. A second position and a third position are based on a height-related characteristic of a user.

According to another aspect, a user-interface assembly is configured to receive a user input. A controller is in communication with a lift system. The controller is configured to operate the cabinet between first, second, and third positions in response to the user input.

According to another aspect, a controller stores a profile database of respective profiles of one or more users. The user inputs a selection of one of the respective profiles having a stored height-related characteristic of a third position.

According to another aspect, a lift system is configured to move a cabinet between first, second, and third positions in response to at least one of a laundry cycle start, a laundry cycle, and a laundry chemistry addition.

According to another aspect, a lift system includes a first lift assembly coupled to a first side of a cabinet and a second lift assembly coupled to a second side of the cabinet.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance system, comprising:
- a laundry appliance including:
  - a cabinet operable between a lowered position and a plurality of raised positions;
  - a drum disposed within the cabinet for receiving items for a laundry cycle; and
  - a door operably coupled with the cabinet, wherein the door is operable between an opened position and a closed position;
- a first lift assembly coupled to a first side of the cabinet;
- a second lift assembly coupled to a second side of the cabinet, wherein the first and second lift assemblies operate concurrently to adjust the cabinet between the lowered position and the plurality of raised positions;
- a user-interface assembly operably coupled to the cabinet, wherein the user-interface assembly is configured to receive a user input corresponding with a selected raised position of the plurality of raised positions; and
- a controller configured to:
  - operate the first and second lift assemblies to the selected raised position in response to the user input;
  - move the laundry appliance between the lowered position and at least one of the plurality of raised positions when the door is in the closed position; and
  - lock the laundry appliance in a current position when the door is in the opened position.

2. The laundry appliance system of claim 1, wherein the user-interface assembly includes a microphone, and wherein the user input is a voice command received by the microphone.

3. The laundry appliance system of claim 1, wherein the user-interface assembly includes a remote device in communication with the controller, and wherein the user input is received by the remote device and communicated to the controller.

4. The laundry appliance system of claim 1, wherein the user-interface assembly includes a sensor, and wherein the controller is configured to determine a height-related characteristic of a user based on sensed information received from the sensor and automatically adjusts the first and second lift assemblies.

5. The laundry appliance system of claim 4, wherein the selected raised position matches a location of a feature of the laundry appliance with the height-related characteristic of the user, the feature including at least one of an upper dispensing drawer and a lower bulk dispensing drawer.

6. The laundry appliance system of claim 1, wherein the controller is configured to adjust the first and second lift assemblies in response to at least one of a laundry cycle start, a laundry cycle end, and a laundry chemistry addition.

7. The laundry appliance system of claim 1, wherein the controller stores a profile of a user, and wherein the controller is configured to adjust the selected raised position of the cabinet in response to a selection of the profile.

8. The laundry appliance system of claim 7, wherein the selected raised position is a predefined height based on a user height-related characteristic stored in the profile.

9. The laundry appliance system of claim 1, wherein the controller includes a memory storing a profile database of respective profiles for one or more users.

10. A laundry appliance system, comprising:
- a storage unit defining an interior;
- a laundry appliance disposed at least partially within the interior of the storage unit, wherein the laundry appliance includes a cabinet and a drum disposed within the cabinet and configured to receive items for a laundry cycle;
- a lift assembly disposed within the interior of the storage unit and operably coupled to a bottom of the cabinet, wherein the lift assembly is configured to vertically move the laundry appliance between a docked position and a raised position; and a controller configured to operate the lift assembly to adjust the lift assembly to the raised position based on a height-related characteristic of a user and a height-related characteristic of at least one selected physical feature of the laundry appliance to be accessed to match a location of the at least one selected physical feature with the height-related characteristic of the user, wherein physical features of the laundry appliance to be accessed include a detergent dispenser, the drum, and a door.

11. The laundry appliance system of claim 10, wherein the detergent dispenser is a dispensing drawer, and wherein the at least one selected physical feature of the laundry appliance is at least one of the dispensing drawer and the door.

12. The laundry appliance system of claim 10, further comprising:

a sensor communicatively coupled to the controller; and a microphone communicatively coupled to the controller, wherein the sensor is configured to determine the height-related characteristic of the user in response to information from at least one of the sensor and the microphone.

13. The laundry appliance system of claim 12, wherein the height-related characteristic of the user is at least one of a location of a voice command, a location of eyes of the user, and a location of shoulders of the user.

14. The laundry appliance system of claim 10, wherein the raised position for each physical feature is based on the height-related characteristic of the user.

15. The laundry appliance system of claim 10, wherein the storage unit defines sidewalls and a front wall having a height less than a height of the sidewalls, and wherein the laundry appliance remains between the sidewalls when in the docked position and the raised position, and further wherein a bottom of the laundry appliance is disposed adjacent to a top of the front wall when in the docked position to provide access to a front of the laundry appliance and enclose the lift assembly in the interior.

16. A laundry appliance system, comprising:

a storage unit defining an interior, wherein the storage unit includes sidewalls and a front wall, and wherein the front wall has a height less than a height of the sidewalls to define a front opening;

a laundry appliance disposed at least partially within an interior of the storage unit, wherein the laundry appliance includes a cabinet and a drum disposed within the cabinet, the drum configured to receive items for a laundry cycle;

a lift assembly disposed within the interior of the storage unit and operably coupled to the cabinet, wherein the lift assembly is configured to vertically move the laundry appliance to raised positions to match locations of physical features on the laundry appliance with height-related characteristics of a user, the physical features including the drum, a single-use detergent dispenser, and a bulk detergent dispenser, and wherein a bottom of the laundry appliance is disposed adjacent to a top of the front wall when in a lowered docked position; and a controller configured to operate the lift assembly to position the laundry appliance relative to the storage unit and to match a height-related characteristic of at least one of the physical features selected to be accessed by the user with at least one of the height-related characteristics of the user.

17. The laundry appliance system of claim 16, wherein the lift assembly is configured to vertically move the laundry appliance between the lowered docked position and a raised position, and wherein at least one of the physical features of the laundry appliance is accessible via the front opening when the laundry appliance is in the lowered docked position.

18. The laundry appliance system of claim 16, wherein the lift assembly is configured to tilt the laundry appliance.

19. The laundry appliance system of claim 18, wherein a rear portion of the lift assembly is configured to vertically adjust to a height above a front portion of the lift assembly to tilt the laundry appliance.

20. The laundry appliance system of claim 16, further comprising:

a cover member coupled to a bottom of the laundry appliance and the front wall, wherein the cover member is configured to expand and collapse with vertical movement of the laundry appliance.

* * * * *